J. ADAMS.
CULTIVATOR.
No. 104,399.  Patented June 21, 1870.
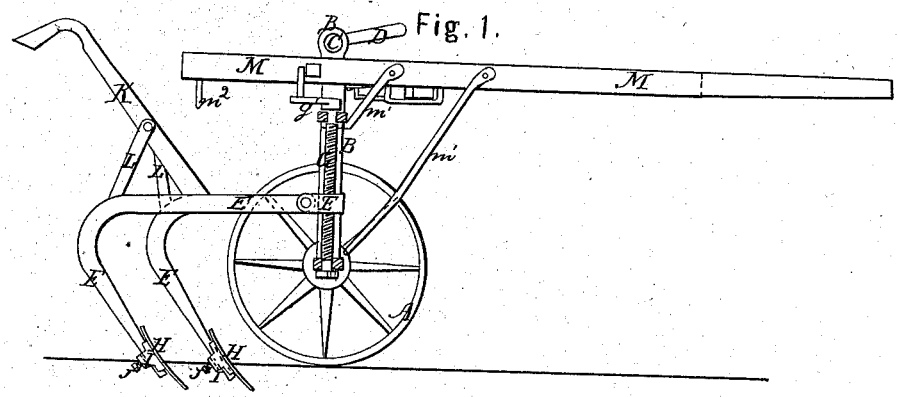
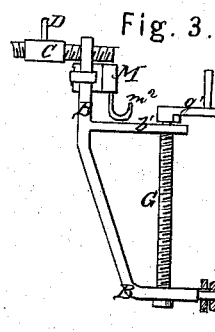
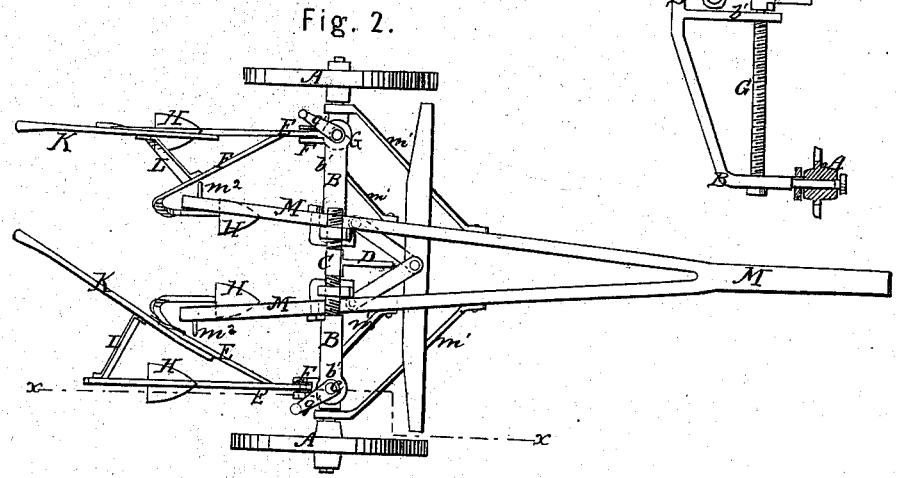
Witnesses
C Raettig
Jno F Brooks
Inventor
J Adams
Per Munn & Co
Attorneys

United States Patent Office.

JOSEPH ADAMS, OF MANTENO, ILLINOIS.

Letters Patent No. 104,399, dated June 21, 1870; antedated June 11, 1870.

IMPROVEMENT IN CULTIVATORS.

The Schedule referred to in these Letters Patent and making part of the same.

*To all whom it may concern:*

Be it known that I, JOSEPH ADAMS, of Manteno, in the county of Kankakee and State of Illinois, have invented a new and useful Improvement in Cultivators; and I do hereby declare that the following is a full, clear, and exact description thereof, which will enable others skilled in the art to make and use the same, reference being had to the accompanying drawing forming part of this specification, in which—

Figure 1 is a side view of my improved cultivator, partly in section, through the line $x\,x$, fig. 2.

Figure 2 is a top view of the same.

Figure 3 is a detail sectional view of the same.

Similar letters of reference indicate corresponding parts.

My invention has for its object to furnish an improved cultivator, which shall be so constructed and arranged that the plows may be easily adjusted closer together or further apart, and raised or lowered, to regulate the depth at which they work in the ground; and It consists in the construction and combination of various parts of the machine, as hereinafter more fully described.

A are the wheels, the axles B of which are bent upward nearly at right angles, and the upper ends of which are connected by a right-and-left screw, C, which passes through holes in the said upper ends, so that the axles B, and, with them, the plows, may be moved toward or from each other by simply turning the screw C.

The screw C may be turned by means of a handle or lever, D, formed upon or attached to its middle part.

E are the beams, the rear parts of which are curved downward, so as to serve as standards for the attachment of the shovel-plows.

The forward ends of the beams or bars E are jointed to nuts, F, through which the crank-screws G pass, so that, by turning the said screws G in one or the other direction, the forward ends of the plow-beams may be raised and lowered, as desired, to regulate the depth at which the plows run in the ground.

H are the shovel-plows, to the rear sides of which are riveted, bolted, or otherwise secured, loops or keepers, I, through which the lower ends of the standards E pass.

The plows H are secured to the beams or standards E by set-screws, J, passing through the said loops I, and pressing against the said standards E, as shown in fig. 1.

K are the handles, which are attached to the curved part of the beams E, and which are strengthened and held in proper position by braces L.

The handles K, one or both, are bent or inclined to one side, so that the operator, while guiding the plows, may walk at the side of the row being cultivated.

The lower ends of the screws G are swiveled to the horizontal parts of the axles B, and their upper ends revolve in arms or supports, $b'$, attached to the upper parts of said axles B, as shown in figs. 1, 2, and 3.

To the upper ends of the swiveled screws G are attached, or upon them are formed, cranks $g'$, by means of which the said screws are operated.

M is the tongue, the rear part of which is branched, and to the said branches are attached the upper parts or ends of the axles B.

The connection between the branches of the tongue M and the axles B $b'$ is strengened by the braces $m^1$, as shown in the drawing.

The rear parts of the branches of the tongue M extend back, and to their rear ends are attached hooks, $m^2$, upon which the plow-beams may be hooked to support the plows above the ground when passing from place to place.

Having thus described my invention,

I claim as new and desire to secure by Letters Patent—

1. The crank-screws G and nuts F, to which the forward ends of the plow-beams are jointed, in combination with the frame-work of a cultivator, substantially as herein shown and described, and for the purpose set forth.

2. The right-and-left screw C, provided with a lever or handle, D, in combination with the adjacent ends of the axles B, substantially as herein shown and described, and for the purpose set forth.

3. An improved cultivator, formed by the combination of the wheels A, axles B, right-and-left screw, C, provided with a handle or lever, D, plow-beams E, jointed to the nuts F, and swiveled crank-screws G $g'$, with each other, and with the branched tongue M, substantially as herein shown and described.

his
     JOSEPH  ×  ADAMS.
            mark.

Witnesses:
 I. E. LABRIE,
 EDWD. SMITH.